US005121145A

United States Patent [19]

Buch et al.

[11] Patent Number: 5,121,145

[45] Date of Patent: Jun. 9, 1992

[54] LINE PRINTHEAD DEVICE FOR NONIMPACT PRINTER

[75] Inventors: Donald C. Buch, Penfield; John P. Marcelletti, Hilton, both of N.Y.

[73] Assignee: Eastman Kodak Company, Rochester, N.Y.

[21] Appl. No.: 562,528

[22] Filed: Aug. 3, 1990

[51] Int. Cl.[5] ..................... G01D 15/06; G03G 21/00; G03G 15/20

[52] U.S. Cl. .................................... 346/155; 355/218; 355/284

[58] Field of Search ................. 346/155; 355/218, 284

[56] References Cited

U.S. PATENT DOCUMENTS

| | | | |
|---|---|---|---|
| 3,914,047 | 10/1975 | Hunt et al. | 355/16 |
| 4,505,576 | 3/1985 | Sugiura et al. . | |
| 4,518,862 | 5/1985 | Dorn . | |
| 4,540,272 | 9/1985 | Abe et al. . | |
| 4,607,950 | 8/1986 | Ishii et al. . | |
| 4,669,864 | 6/1987 | Shoji et al. . | |
| 4,734,788 | 3/1988 | Emmett et al. | 346/160 X |
| 4,752,804 | 6/1988 | Ohno . | |
| 4,803,515 | 2/1989 | Hoshino et al. . | |
| 4,819,028 | 4/1989 | Abe . | |
| 4,821,066 | 4/1989 | Foote et al. | 346/157 X |
| 4,837,636 | 6/1989 | Daniele et al. | 346/108 X |
| 4,887,128 | 12/1989 | Jamali et al. | 355/218 X |

FOREIGN PATENT DOCUMENTS

| | | |
|---|---|---|
| 0291738 | 11/1988 | European Pat. Off. . |
| 0319241A2 | 6/1989 | European Pat. Off. . |

OTHER PUBLICATIONS

US Appl. Ser. No. 07/232,073 Mosehauer et al corres to WIPO publication WO90/01730 published Feb. 22, 1990 (International Application No. PCT/US89/03400).

*Primary Examiner*—George H. Miller, Jr.

*Attorney, Agent, or Firm*—Leonard W. Treash

[57] ABSTRACT

An optical encoder monitors linear CCD elements as an edge of a perforation or other optical indicia passes along the elements. A line printhead is actauted at least one in response to each new element being activated. The device is particularly useful in a color nonimpact printer in which multiple images are superimposed by line printing, preferably at printheads at a plurality of locations, to create multicolor images.

22 Claims, 3 Drawing Sheets

LINE PRINTHEAD DEVICE FOR NONIMPACT PRINTER

TECHNICAL FIELD

This invention relates to nonimpact printing apparatus, and more particularly to a line printhead device having an image line registration apparatus cooperating with illuminated optical indicia, for example, perforations, along the edge of an image receiver. The invention is particularly usable in electrophotographic devices of the type in which two or more single color images are formed in registration on an image member.

BACKGROUND ART

Most commercial electrophotographic color processes form separate toner images on the same or separate members and transfer them in registration. With these processes, both exposure and transfer must be properly timed for good color registration.

LED printheads and other similar electronic exposure devices expose each line of an image at essentially one time in response to a timing signal. U.S. Pat. No. 4,821,066 Foote et al describes a color printer in which this timing signal is generated in response to a set of perforations along the edge of a web image member. The perforations are sensed by a printhead sprocket, which printhead sprocket drives a rotary encoder. Because each line or set of lines is exposed in response to an encoder signal, the exposure is independent of variations in the speed of the receiver. Variations in the speed of moving webs are particularly difficult to eliminate and, without an encoder, defects caused by such variation will be noticeable in a high resolution final image.

In the Foote et al patent single color images are both exposed and transferred in response to sprocket engagement of the same perforation. Two or more images are superimposed in transfer using sprocket-perforation timing based on the encoder controlled LED exposure. Inaccurate positioning of lines of exposure that are ultimately superimposed will alter the color of that line.

U.S. patent application Ser. No. 232,073, Mosehauer et al (corresponding WIPO publication 8903400, 1990), describes an electrophotographic process in which a multicolor image is formed using two or more electronic exposures of a single frame of an image member. See also, U.S. Pat. Nos. 4,669,864; 4,819,028 and 4,540,272. Transfer of the multicolor image is in one step and does not affect registration of colors. In this process, registration of the exposures is critical to final image quality. Again, exposure timing is controlled by an encoder-sprocket-perforation system.

U.S. Pat. No. 4,837,636 discloses printing apparatus in which a row of marks along the edge of a receiver cooperates with a light source and a CCD series for sensing the velocity of a recording member in copying/printing apparatus. This sensed velocity is fed back to the printer to control the printer drive mechanism.

Other patents of possible interest are U.S. Pat. Nos. 3,914,047; 4,505,576; 4,518,862; 4,803,515; 4,607,950; 4,734,788; 4,752,804; EP O 319 241 A2; and European Patent Application 0 291 738.

DISCLOSURE OF THE INVENTION

It is an object of the invention to provide a line printhead device for a nonimpact printer, which printhead device accurately times printline formation. It is especially useful in (but not limited to) printers in which the printlines forming a first image must be registered with high accuracy to the printlines forming a second image, for example, to form multicolor images.

It is a further object of the invention to provide an optical encoder which eliminates many of the problems associated with rotary encoder systems, such as roller runout, roller diameter tolerances, film to roller slip, film flutter and film-to-sprocket backlash.

These and other objects are accomplished by a line printhead device for a nonimpact printer in which printer a receiver is moved past the line rprinthead device for exposure. The receiver has a series of changes in optical density, for example, perforations in an opaque strip. The line printhead device includes means for writing an image line on the receiver in response to an electrical write signal and a linear CCD or similar linear scanning array positioned to receive radiation attenuated by the changes in optical density. The CCD is monitored to provide a series of write signals for the writing means representative of the moving position of the receiver.

According to a preferred embodiment, the receiver is in the form of an endless belt and has spaced perforations or marks of similar size along one edge. It is convenient to provide the perforations in an opaque strip, as the opacity in the areas between perforations provides increased contrast between the light transmitting abilities of the perforation and non-perforation areas.

According to a further preferred embodiment of the invention, the invention is especially useful in connection with color printing apparatus of the type in which a plurality of latent images are formed at one or more exposure stations on a single area of a moving receiver, such as the photoconductor of an electrophotographic printer.

It is understood that in electrophotographic color printers accurate registration of the different colors is essential to obtaining a sharp final image. Such highly precise registration is an outstanding advantage of the present invention over the prior art. However, it is also understood that the invention can be used to improve the uniformity of a single image in the presence of changes in the speed of the receiver.

BRIEF DESCRIPTION OF THE DRAWINGS

In the detailed description of the preferred embodiment of the invention presented below, reference is made to the accompanying drawings, in which.

BEST MODE OF CARRYING OUT THE INVENTION

The invention can be used in a variety of nonimpact printing operations. It will be described with regard to an electrophotographic printer.

Figure 1:
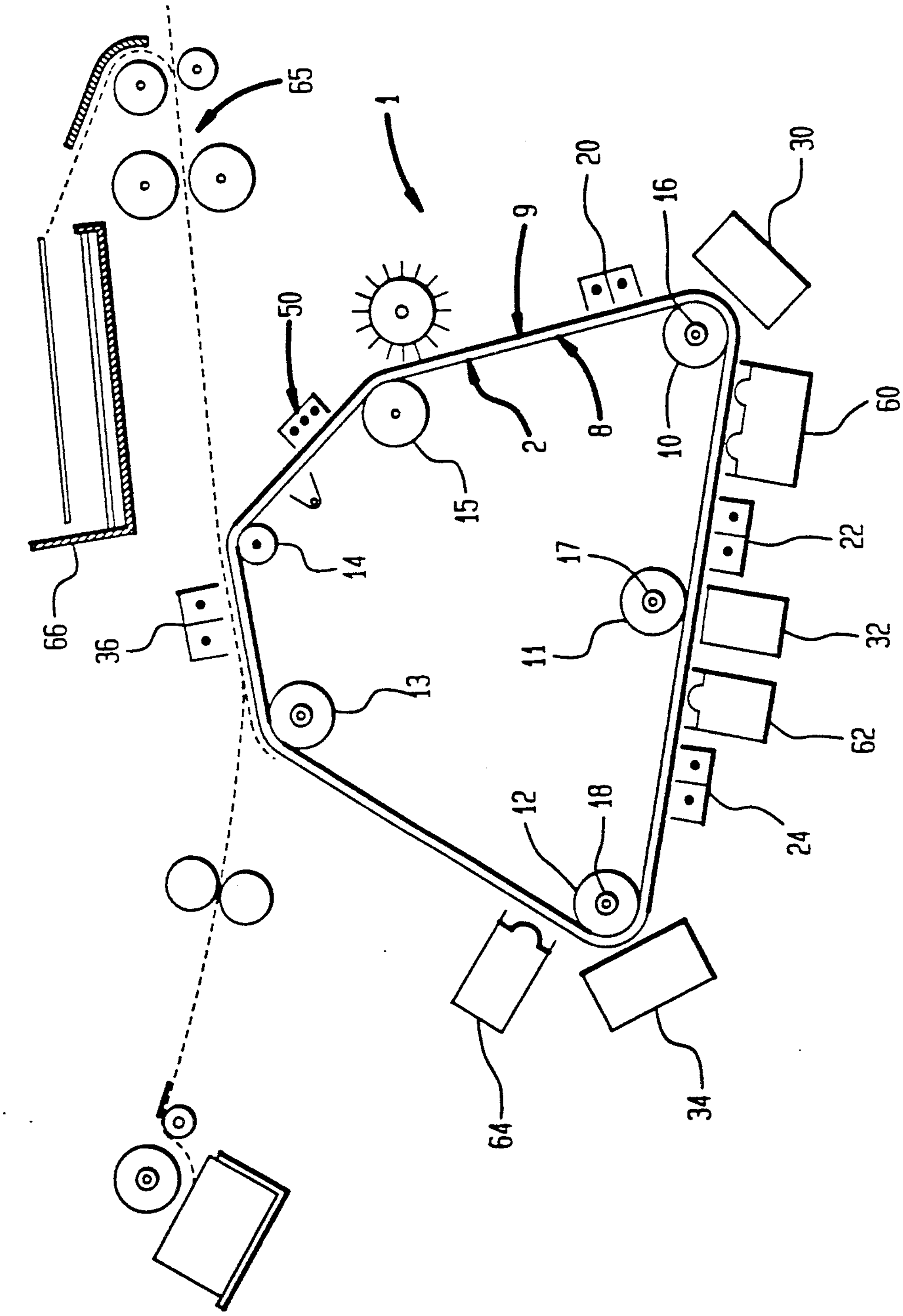
FIG. 1 is a schematic side elevation of an electrophotographic printer of the type with which the invention is particularly useful.

According to FIG. 1, a nonimpact printer 1 includes a receiver 2, which in this case is a photoconductive web or belt entrained about a series of rollers 10, 11, 12, 13, 14 and 15. The web is a multilayer structure which can take various forms, but is commonly a photoconductive layer 9 on a conductive backing 8 with a suitable support. Web 2 is driven in a clockwise direction as viewed in FIG. 1 by one of the rollers at as constant a velocity as practical through operative relationship with a series of electrophotographic stations as will be described.

A first charging station 20 imparts a uniform charge to an image area or location on the photoconductive surface on web 2, which charge may be of either polarity depending on the characteristics of the web. As the web moves, the uniformly charged area is then exposd at a first electronic exposure station 30 at which is located, in accordance with the present invention, a line printhead, light source and linear CCD (or equivalent device) as will be described in more detail below. The exposure is by any known line exposure device which converts electrical signals into a light image, for example, an LED printhead.

This first electrical image is toned at a first toning station 60 by the application of finely divided marking particles which are charged to the same polarity as the original charge placed on the web at 20, thereby toning the areas of the web that are discharged by exposure at station 30, thus creating a first toner image of a first color, for example, blue.

The same image area of the web then passes into operative relationship with a second charging station 22 which essentially repeats the process of first charging station 20, uniformly charging the web to a polarity the same as that imparted at 20. The uniformly charged web 2 is next imagewise exposed at a second electronic exposure station 32, like station 30, to create a second electrostatic image by imagewise discharging the photoconductor. The second electrostatic image is then toned at station 62 by the application again of a finely divided toner of a second color having a charge the same as the uniform charge placed on the photoconductive member at second charging station 22, thus creating a second toner image of a second color, for example, red.

The process is again repeated through a third charging station 24, imagewise exposure at a third exposure station 34, which is like station 30, and toning at a third toning station 64 to create a third toner image of a third color, for example, black.

At this stage in the process, a single frame or image area contains three superimposed color images, i.e., a multicolor toner image. A fourth set of stations, not shown, could be used to add a fourth toner image, for example, yellow. In many printer applications each color image is derived from an original image scanned into the system, so that each toned image differs from each other toned image in accordance with the manner in which the respective colors apppear in the original.

The multicolor toner image is then transferred to a copy sheet at a transfer station 36 at which registration is not critical and then fixed at a fusing station 65 and ejected from the apparatus to receiving tray 66.

In the apparatus just described, multicolor images are produced at the same rate as monocolor images can be produced. Registration need only be accomplished in respect to exposing stations 30, 32 and 34. The present invention provides a simple but novel and unobvious apparatus for accomplishing such registration in a highly precise manner.

Figure 2:
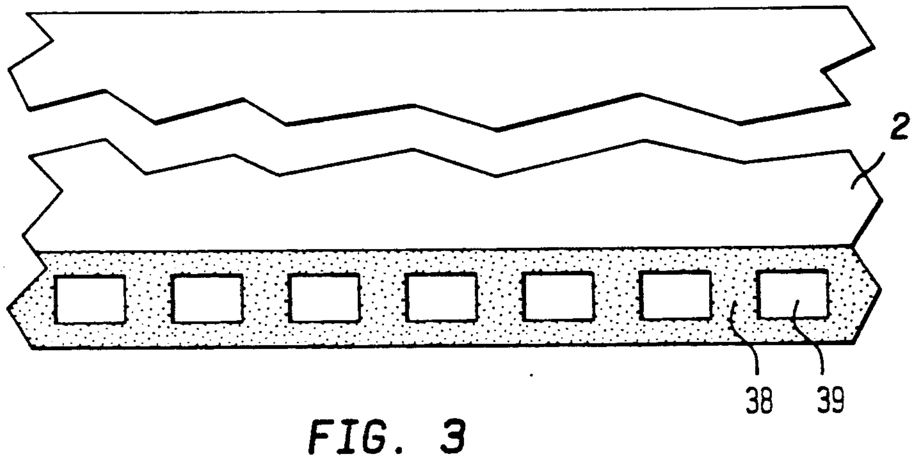
FIG. 2 is a top plan view of a portion of a photoconductor for receiving images.

Referring now to FIG. 2, the receiver 2 is provided along one edge with an opaque stripe 38. Perforations 39 are formed in the stripe. These perforations could cooperate with a drive sprocket wheel to drive receiver 2, although friction drive at one of the rollers is preferred. For ease in manufacture, the perforations are all of the same size and evenly spaced. For purposes of this invention, the stripe need only be opaque or otherwise attenuate light. However, it could also be made conductive to help ground the conductive backing which is typically buried between a support and the photoconductive layer or layers on receiver 2, thus performing two independent functions.

Figure 3:
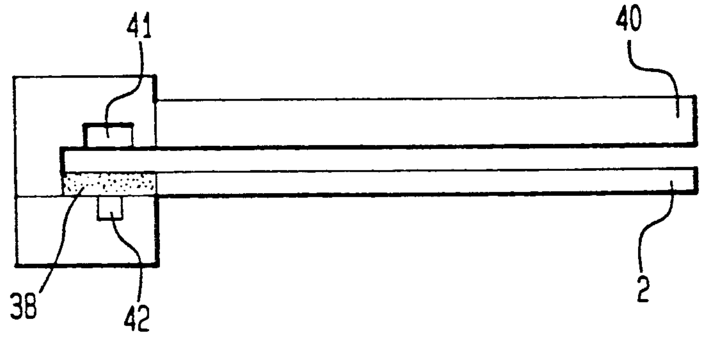
FIG. 3 is a transverse sectional view, partly in elevation, showing the relation of a printhead, receiver, light source and CCD array at an imaging station.

FIG. 3 shows the receiver 2 below a line printhead 40 which extends across the receiver transversely to the direction of travel thereof. To the left of the printhead is seen endwise an elongated light source 41 and a linear CCD array 42. The light source and CCD array are located on opposite sides of the receiver belt so that the perforated area of the belt passes between them. The light source need not be a source of visible radiation, but only a source of radiation to which CCD 42 is sensitive. The printhead 40, source of illumination 41 and CCD 42 are a line printhead device and are preferable made as a unit. Portions or all of the control circuitry may also be included in the unit. Advantageously, they can be removed and cleaned as a unit.

As will be evident from this description, array 42 need not be a complete CCD array. Any linear series of photodiodes or comparable sensors that are radiation sensitive and can be electronically monitored can be used. Since the most common such device is a CCD, it will be referred to as such herein.

Figure 4:
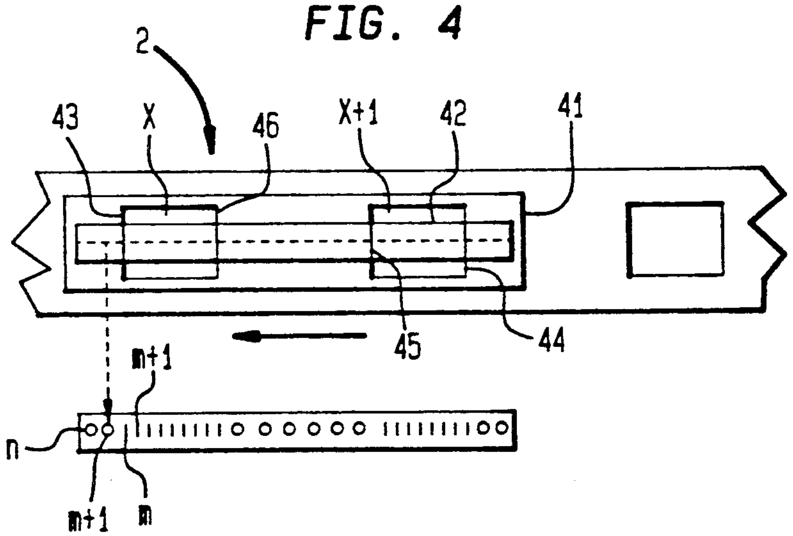
FIG. 4 is a detail schematic top view of a portion of the edge of the receiver, illustrating sprocket holes and their relation to the CCD array.

FIG. 4 shows two of the performations and the relative sizes and locations of the light source and CCD array, 41 and 42, respectively. For clarity, none of the primary elements are drawn in phantom. It will be seen that the light source and CCD are of approximately the same length. The two perforations are identified in FIG. 4 as x and x +1 (or "next") perforations. The x perforation has a leading edge 43 and a trailing edge 46, while the x +1 perforation has a leading edge 45 and a trailing edge 44.

Figure 5:
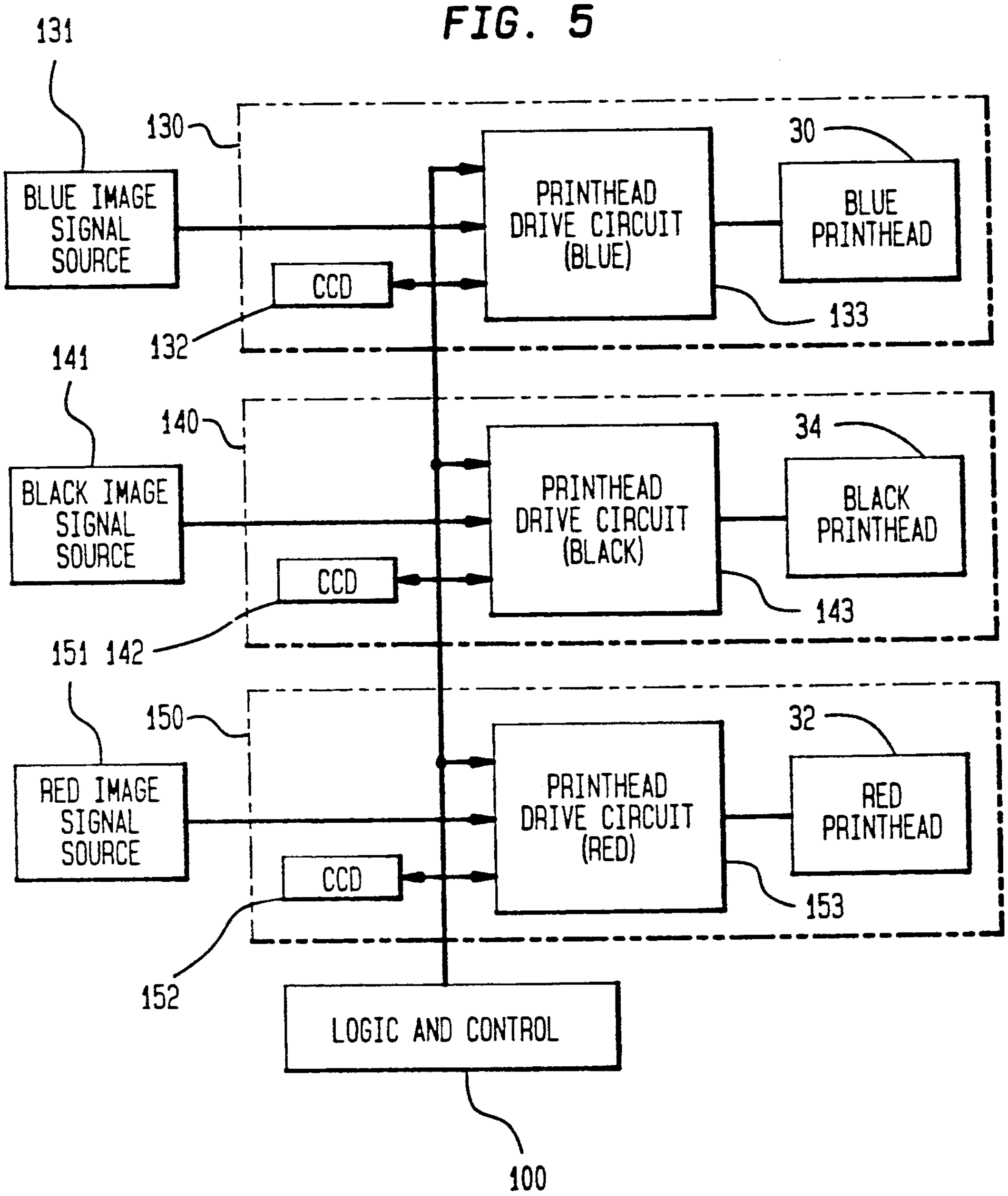
FIG. 5 is a diagrammatic illustration of an operating circuit for the invention.

FIG. 5 shows circuitry for controlling exposure in the nonimpact printer shown in FIG. 1. According to FIG. 5, signals representing blue, black, and red images are input to line printhead devices 130, 140 and 150, from suitable sources 131, 141 and 151, which may be a color scanner, a memory, a computer or the like and are controlled by a logic and control 100.

The image signals are input to printhead drive circuits 133, 143 and 153 and ultimately control each line of exposure by printheads 30, 32 and 34. Each printhead drive circuit accesses one of CCD's 132, 142 or 152 to receive write signals for proper timing of the printheads. Logic and control 100 controls the accessing of the CCD's and also the timing of the image information from sources 131, 141 and 151. This timing must be properly delayed since each image area passes the printheads 30, 32 and 34 at different times. Such delay logic is known in the art and is not part of this invention.

MODE OF OPERATION

At each exposure station 30, 32, 34, light source 41 and linear CCD array 42 provide means for tracking the edges of the belt perforations as they are physically moved along the CCD array.

In FIG. 4, the CCD array has "n" number of CCD elements, and perforation (perf) x is the "current perf". Its left or leading edge 43 is the location of the current CCD element "m". The device scans element m+1 until it sees a transition from 0 to 1 (1 being active or illuminated through the perf, and 0 being inactive, or dark). When the transition occurs, the device outputs a pulse to the printhead drive circuit to write a line of data which the device may do immediately or after a set delay. Element m+1 then becomes the current element, and the device scans the next element to the left. The device then keeps track of the current location of the transition point.

With this approach, a line is written once every time edge 43 passes a CCD element. The lines are as precisely spaced as are the CCD elements. Using a 300 element per inch CCD will give a very accurate 300 line per inch image regardless of the speed of the receiver 2 or, more importantly, variations in the speed of receiver 2. Obviously, two or more lines could be writtem for each CCD element allowing a lower density CCD and giving up some high frequency preciseness.

In the condition when the "mth" element becomes equal to n (the total number of elements), the circuitry will then have to return to the right end of the CCD array to find and make current the new transition point of perf x+1. This is also done when the device resets upon start up. It will start at an element which we will call element 0 and test for an active element, that is, an illuminated element. If the element is not active, it will update the next element which we will call element "1" to test it, and so on until it finds an active element. When an active element is found, the element to its left is also tested. If that element is also active, then the test advances to the left. When the element to the left is found to be inactive, this means that the device has found the location of the left perf edge 45. The last active element is then logged as the current element, and the device then begins tracking the position of the new transition point. The reset scan or left edge scan (meaning that the current transition point has gone past element "n") will occur rapidly, to ensure that no film movement is missed.

The actual spacing between the last line written off perforation edge 43 and the first line written off edge 45 will vary by an amount that could be almost as much as a line, although accurate perforation formation can reduce the variance. This variance can be corrected by a more sophisticated system which will be described below. However, it need not necessarily be corrected for, because it is a function of the distance between edges 43 and 45 which will be the same for each color of image. Thus the colors will still be in registration even though one spacing between lines may be slightly off.

To correct for even this small variation, according to a preferred embodiment, edges 43 and 45 are monitored substantially simultaneously during a portion of the time edge 43 is the active edge. This will allow the logic and control to determine which edge is lagging the other with respect to the CCD's turning to active as edges 43 and 45 move, and by how much. The lag can then be corrected for. For example, the logic and control may send a pulse to write a line, say, 100 clock pulses after CCD element m+1 changes from 0 to 1 in response to edge 43 uncovering it. Another CCD element in the vicinity of edge 45 also changes from 0 to 1, say, 20 clock pulses later, showing that edge 45 is lagging edge 43 by 20 clock pulses. When the CCD element n has changed to 1, edge 45 is now used to trigger writing the next line. To correct for the lag, the set of write pulses associated with edge 45 should be sent 80 clock pulses after a CCD changes from 0 to 1. Since edge 45 lags edge 43, the first transition after switching to edge 45 cannot be used and must be skipped.

Note that the perforations do not have to be evenly spaced or the same size, they only need to have edges which are close enough together to be covered by the CCD. Note also that perforations are only one way of providing optical attenuation for the CCD elements. For example, transparent marks on an opaque background or vice versa could also be used. Similarly, using reflection optics, a totally opaque variation in reflectivity (on a drum photoconductor, for example) could be projected onto a linear CCD oriented in any direction. Perforations are attractive from a manufacturing standpoint, because accurate and inexpensive perforation formation is a well developed art presently used with electrophotographic webs. The CCD could be replaced with an equivalent linear scanning array. Preciseness of the system is based upon the regularity of its response as the active edge moves over it. CCD's are available with vary precise spacing and high resolution and, thus, are attractive for this application.

The invention is shown with the CCD and its software monitoring consecutive leading perforation edges. However, consecutive trailing edges could be monitored with comparable programming. Further, the CCD could alternate between leading and trailing edge monitoring. With this alternative, the CCD would only have to be long enough to cover two consecutive edges, not two consecutive perforations. To reduce the effects of even a small amount of CCD variance (not a problem for most applications) two or more (for example, 10) edges can be simultaneously monitored and a write pulse generated as an average of CCD pulses.

Figure 6:
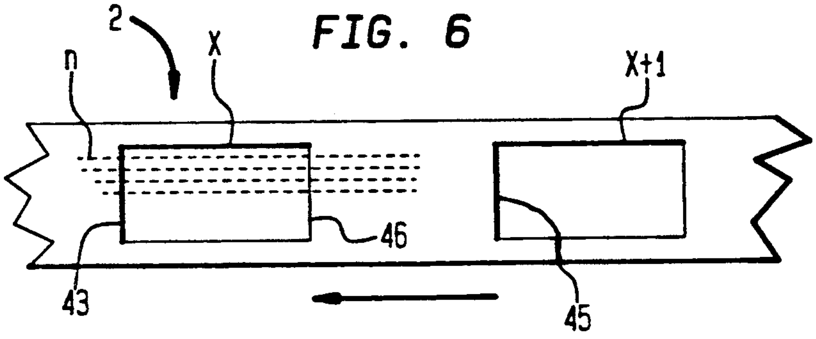
FIG. 6 is a detail schematic top view similar to FIG. 4 illustrating an alternative embodiment of the invention.

FIG. 6 illustrates another preferred embodiment of the invention. According to FIG. 6, the CCD can be a two dimensional array with a plurality of lines, each offset from the lines next to it. As shown in FIG. 6, four CCD lines are each offset by one-fourth of the distance between comparable points on successive elements in a line. Thus, the drive circuits would receive four signals in the same time in which one signal was received in the FIG. 4 embodiment. These extra signals can be used to actuate the printhead four (or two) times as often to increase the resolution of the image formation. Alternatively, these signals can be used to control transition between perforation edges. According to this approach, the print drive circuit is set to print in response to every fourth change in state of CCD elements being passed by edge 43. When the last or nth elements turns on, the elements are tested again from the right and the next element to turn off as edge 46 passes provides the next change of state to be counted. This reduces the transition error from switching perforation edges to 25% of the first FIG. 4 embodiment explained above. Of course, the error correction scheme proposed with respect to FIG. 4 in which both edges are monitored simultaneously would not be as useful with the FIG. 6 approach, but could be used with it for finer transition control.

In the prior art much attention has been paid to film jitter correction, a condition in which, due to influences outside the film drive system, small changes in the drive loading cause the film to pause or to move temporarily backward on a minute scale. The overall direction of film movement always remains forward. A standard rotary encoder attached to a shaft/roller turning with the film will output multiple counts as the film jitters back and forth. This assumes that the resolution of the encoder is fine enough to detect the small motions of jitter, which it would normally be when used for high print density resolutions. These multiple counts will create an undesirable condition of multiple lines of print in the same film space. To avoid this when using a rotary encoder, it is necessary to use a more costly absolute encoder instead of an incremental encoder. This would then have to be set up and aligned with a reference mark on the film. This would place a much higher software burden on the central logic unit. Other alternatives include keeping track of encoder direction and withholding pulses from the encoder during conditions of jitter. This also places a much higher software burden on the central logic.

The CCD film encoder of the present invention will automatically correct for film jitter conditions. If the current element is the mth element, then the control circuitry will have already sent the output pulse corresponding to that line. The printhead actuator circuit 46 would have already issued a write pulse to the proper LED line printer 40 corresponding to the pulse received from the CCD array. Assuming that the film jitters back so that the leftmost active pulse is now the $m-1$ pulse, the control circuitry will still be scanning for the inactive-to-active transition of pulse $m+1$. No further output pulses will occur until the film perf edge returns to the correct direction and crosses the $m+1$ CCD element. This will ensure that no additional line will be printed until the film has reached the correct absolute film position.

The invention has been described in detail with particular reference to a preferred embodiment thereof, but it will be understood that variations and modifications can be effected within the spirit and scope of the invention as described herein and as defined by the appended claims. For example, although FIG. 1 shows a multiple printhead, multicolor apparatus in which the invention has spectacular application, it has the advantage of even exposure despite variations in the movement of the receiver. This advantage makes the invention useful also in single printhead systems whether multicolor or single color.

We claim:

1. For use in a nonimpact printer of the type in which a receiver is moved past a printhead, the receiver having a series of changes in optical density, a line printhead device comprising, means for writing at least one image line on such a receiver in response to an electrical write signal, and means responsive to movement of the series of changes in optical density for creating a series of write signals, said means including a linear array including a linear series of radiation responsive elements, means for illuminating said array with radiation attenuated by the moving series of changes in optical density, and means for monitoring said array to provide a series of write signals representative of the moving position of the receiver.

2. The line printhead device according to claim 1 for use with a web receiver having the series of changes in optical density in the form of variations in radiation transmissivity running along an edge of the receiver, and wherein said printhead device includes a source of radiation positionable on one side of said web and wherein said linear array is positionable on the opposite side of said receiver.

3. The line printhead device according to claim 2 wherein said array and said source of radiation are fixed with respect to each other and each have relatively flat surfaces facing each other across a gap through which an edge of said web is movable.

4. The line printhead device according to claim 1, wherein said linear array, said means for illuminating said array, and said means for writing an image are formed as a single unit for insertion in a nonimpact printer.

5. The line printhead device according to claim 3 wherein said unit also includes said means for monitoring said array and for creating said write signal in response to said monitoring.

6. A nonimpact printer having a line printhead device according to claim 1.

7. In a multicolor nonimpact printer comprising:

a photoconductive image receiver, means for uniformly charging said receiver, means for imagewise exposing said receiver to create a first electrostatic image, means for applying a toner of a first color to said first electrostatic image to create a first toner image of said first color, means for imagewise exposing said receiver to create a second electrostatic image in the same general area as said first toner image, means for applying toner of a second color to said second electrostatic image to create a second toner image which, with said first toner image, forms a multicolor toner image, the improvement wherein each of said means for exposing includes a line printhead device according to claim 1.

8. The nonimpact printer according to claim 7 wherein said means for exposing to create said first and second electrostatic images include first and second line printheads each constructed according to claim 1 and each positioned at separate positions to expose said image receiver.

9. A nonimpact printer comprising means for supporting an endless web receiver, at least a portion of said receiver along an edge of said receiver being opaque, and said receiver having a series of perforations in said opaque portion running parallel to said edge and movable along a path with said receiver, means for writing an image line on said receiver in response to an electrical write signal, a source of radiation positioned on one side of the path of said perforations, said source being elongated in the direction of movement of said perforations, a linear array of radiation responsive elements positioned directly opposite said source with respect to said path and being oriented in the direction of movement of said perforations, the elements of said array being successively uncovered and covered by the leading and trailing edges of the perforations with respect to said source, and means for monitoring the array to provide write signals to said means for writing in response to either said covering or uncovering.

10. A nonimpact printer according to claim 9 for use with a receiver which is photoconductive and including means for uniformly charging said receiver and wherein said means for writing is an LED printhead, actuation of which imagewise discharges a line of charge on said receiver.

11. A nonimpact printer according to claim 9 wherein said linear array includes a plurality of lines of elements oriented in the direction of movement of said perforations, the elements of each of at least one of said lines being offset in said direction of movement from the elements of another of said lines.

12. A nonimpact printer according to claim 9 wherein said monitoring means includes means for monitoring a first element until a change in radiation from the passing of a perforation edge changes the condition of that element and then for monitoring the element next in the direction of movement of said perforations until it also changes its condition, and for repeating that process moving along the array and means for providing said write signals in timed relation to said changes in condition.

13. A nonimpact printer according to claim 12 wherein said monitoring means further includes means for resetting itself upon a change in condition of the last element in the array in said direction of movement, said resetting means including means for monitoring successive elements starting with the opposite end of the array and proceeding in said direction of movement until a desired change in condition of adjacent elements indicates a desired edge of a perforation to be monitored.

14. A nonimpact printer according to claim 12 wherein said monitoring means includes means for monitoring elements associated with two in-track-separated upstream and downstream perforation edges and for generating an error signal indicative of the time one edge lags the other in causing a change in the condition of its respective elements, means for utilizing the downstream edge to provide write signals, means for switching to the upstream edge to provide write signals, and means utilizing said error signal to adjust the timing of said write signal when said write signal is provided in response to said upstream edge.

15. A nonimpact printer according to claim 14 wherein said upstream and downstream edges are the leading edges of consecutive perforations.

16. A nonimpact printer according to claim 14 wherein said upstream and downstream edges are consecutive edges of said perforations whether leading or trailing.

17. Image line registration apparatus for nonimpact printing apparatus of the type in which latent images are formed at a plurality of exposure stations, said images being formed successively at a single location on a moving receiver having perforations along one edge, said registration apparatus comprising:

at each imaging station, (a) elongated light source means extending along the path of movement of said perforations for directing light therethrough, (b) a linear CCD positioned similarly to said light source to receive light through said perforations from said light source, the lengths of said light source means and CCD being at least as great as the distance from the leading edge of an aperture to the trailing edge of the same aperture, and (c) a line printhead extending transversely to the direction of movement of the receiver, for imaging said receiver when actuated, and means receiving output electrical pulses from the CCD array at the respective stations in accordance with the transition between illuminated and non-illuminated states of an element of said CCD at that station, to actuate the printhead at that station.

18. Apparatus according to claim 17, in which said printhead comprises a series of light emitting diodes.

19. Apparatus according to claim 17, in which said light source and CCD array are attached to said printhead.

20. Apparatus according to claim 17, in which said receiver is a photoconductive member and said images are electrostatic.

21. Apparatus according to claim 20, said receiver having an opaque stripe along the edge having said perforations, thereby providing efficient light blocking in the non-perforation areas.

22. Apparatus according to claim 17, in which said printhead comprises a series of light emitting diodes, said light source and CCD array are attached to said printhead, and said receiver has an opaque stripe in which said perforations are located.

* * * * *